(12) United States Patent
Paganelli

(10) Patent No.: US 6,476,922 B2
(45) Date of Patent: Nov. 5, 2002

(54) APPARATUS FOR MEASURING VARIATIONS IN SIZE ON BODIES SUBJECTED TO TEMPERATURE VARIATIONS

(75) Inventor: Mariano Paganelli, Modena (IT)

(73) Assignee: Expert System Solution S.r.L., Modena (IT)

( * ) Notice: Subject to any disclaimer, the term of this patent is extended or adjusted under 35 U.S.C. 154(b) by 0 days.

(21) Appl. No.: 09/886,037

(22) Filed: Jun. 22, 2001

(65) Prior Publication Data

US 2002/0044288 A1 Apr. 18, 2002

(30) Foreign Application Priority Data

Oct. 13, 2000 (IT) .................................... MO00A0219

(51) Int. Cl.[7] .................... G01B 11/04; G01B 11/00; G01N 25/16
(52) U.S. Cl. .................... 356/634; 356/625; 374/55
(58) Field of Search ......................... 356/625, 634, 356/635; 374/55

(56) References Cited

U.S. PATENT DOCUMENTS 4,770,537 A * 9/1988 Koskenohi .................. 356/384
2002/0044288 A1 * 4/2002 Paganelli ..................... 356/625

* cited by examiner

*Primary Examiner*—Georgia Epps
*Assistant Examiner*—David N. Spector
(74) *Attorney, Agent, or Firm*—Browdy and Neimark

(57) ABSTRACT

The apparatus comprises: a holder for a test piece; at least two optical systems, identifying two optical paths located at a predetermined and known reciprocal distance, which are able to focalize, with a predetermined degree of magnification, images of two ends of the test piece; the at least two optical systems being aligned with the holder; at least one viewing and measuring device able to collect the images which are focalized by the at least two optical systems. The apparatus is structured to perform measurement of a size of a test piece while completely eliminating any influence on such measurement on the part of the holder or the measuring system.

11 Claims, 2 Drawing Sheets

APPARATUS FOR MEASURING VARIATIONS IN SIZE ON BODIES SUBJECTED TO TEMPERATURE VARIATIONS

BACKGROUND OF THE INVENTION

Specifically, though not exclusively, the invention is usefully employed as a dilatometer.

This instrument is for measuring a linear size variation of a sample or test piece when the piece undergoes a temperature change.

The test piece is located inside an oven, generally tubular, and controlled variations of the temperature inside are made.

The variations in size of the test piece on varying the temperature are measured by instruments known as dilatometers, which differ among themselves in terms of both the heating system used and the size-variation measuring system.

Mechanical, electronic or optical methodologies are used to measure the size variations, while the heating systems are almost always electrical systems working by radiation.

In mechanical dilatometers the test piece is placed in contact with a system of levers which amplify any even tiny fluctuation in size—representing such directly on a sheet of paper with a pen.

In electronic dilatometers the test piece is in contact with a rod made of a refractory material which transfers the size variations to an electronic device that converts the movement into an electric signal by means of a differential transformer. The electric signal is then amplified and transformed into a graph through a processing system.

An optical dilatometer measures size variations through a light beam which is deflected by a mirror connected to the sample piece by a mechanical lever. With a laser beam the measurement can be carried out using Abbe's method (optical interferometry) whose resolution is equal to the wavelength of the light used.

A recent innovation in the field of dilatometry is that measurements of size variation can now be made without touching the test piece, but simply by observing it with a high-definition television camera. In this way measurements can be made of samples in liquid or semi-liquid state.

In the majority of cases, the test piece in the oven is in contact with a system of measurement which inevitably is subject to deformations which influence the measurement and which, in all cases, is in contact with a support that, as it undergoes size change itself during the measurement operations, must influence the accuracy of the measurements. It is therefore always necessary to calibrate the instrument, which in practice means measuring a piece of known dilation properties, so that deviations from zero produced in the instrument itself can be recorded.

In the case of mechanical or electronic dilatometers, where the test piece is located in a holder made of refractory material and the size variations are read by a rod also made of refractory material, the situation which arises is rather complex, inasmuch as all the elements of the measuring system are subject to thermal dilation. The result of this complex sum of different dilations can cause the measuring system dilation to be of the same order as the dilation of the piece being tested. Naturally the dilation of the measuring system must then be subtracted from the dilation of the test piece, and this operation can be done either manually or automatically. These measuring system calibration operations must be repeated frequently because ageing of the materials leads to a change in their thermal-mechanical characteristics; thus a standard control procedure is needed at fixed intervals.

It often happens that the same material gives different dilation measurements if measured using different instruments, due to the fact that the calibration procedure has not been carried out in exactly the same way.

With non-contact optical dilatometers, too, problems connected with instrument calibration persist. Even if the test piece is never touched by the measuring system, it still has to be put in a holder so that it can be perfectly positioned inside the oven chamber. The holder is subject to heat-dilation which must be measured and subtracted from those of the test piece during the test.

All of the preceding leads to very considerable doubts as to the exactitude of the measurements; extreme caution in carrying out the measurements is required in all cases.

The main aim of the present invention is to obviate the limitations and drawbacks in the prior art.

The invention radically solves the problems connected with dilation of the measuring system and/or the test piece holder, virtually eliminating the need for a clumsy and time-consuming calibration curve.

The invention is even more useful in the measurement of dynamic-type dilation, where the thermal-mechanical behaviour of the test piece is to be calculated under conditions of continually-varying temperature.

With the prior art, it is necessary to calibrate the measuring system much more frequently.

Where the thermal-mechanical behaviour of the piece is to be measured under extreme heat gradient conditions, a calibration curve has to be drawn up each time, with the same heat cycle as for the actual test.

With known dilatometers, heat gradients of from 5 to 20 c°/min are used. Lower gradients require too much time, while higher gradients do not guarantee repeatability of the test.

Today, however, in the industrial field, much higher gradients are reached, meaning that there is a strong demand for thermal-mechanical testing at high heating gradients.

The new device of the invention enables a thermal-mechanical measuring system to be set up both economically and free of those errors caused by the piece-holding and measuring systems in the prior art; and it is particularly suitable for high-gradient measurements.

The invention is also much less sensitive to vibrations with respect to traditional systems.

A further advantage of the invention is the total absence of moving parts in the measuring system. Once assembled and calibrated it is not subject to wear or deterioration, unlike known-type mechanical or electronic systems, which require high-precision mechanical operations on the moving metal parts, which are subject to wear.

These aims and advantages and others besides are all attained by the invention as it is characterised in the appended claims.

SUMMARY OF THE INVENTION

The apparatus comprises: a holder (1) for a test piece (2); at least two optical systems (3 and 4), identifying two optical paths located at a predetermined and known reciprocal distance, which are able to focalize, with a predetermined degree of magnification, images of two ends of the test piece (2); the at least two optical systems (3 and 4) being aligned with the holder (1); at least one viewing and measuring device (7) able to collect the images which are focalized by the at least two optical systems (3 and 4). The apparatus is structured to perform measurement of a size of a test piece (2) while completely eliminating any influence on such measurement on the part of the holder or the measuring system.

BRIEF DESCRIPTION OF THE DRAWINGS

Further characteristics and advantages of the present invention will better emerge from the detailed description that follows of a preferred but non-exclusive embodiment of the invention, illustrated purely by way of non-limiting example in the accompanying figure of the drawing, in which.

DESCRIPTION OF THE PREFERRED EMBODIMENTS

Figure 1:
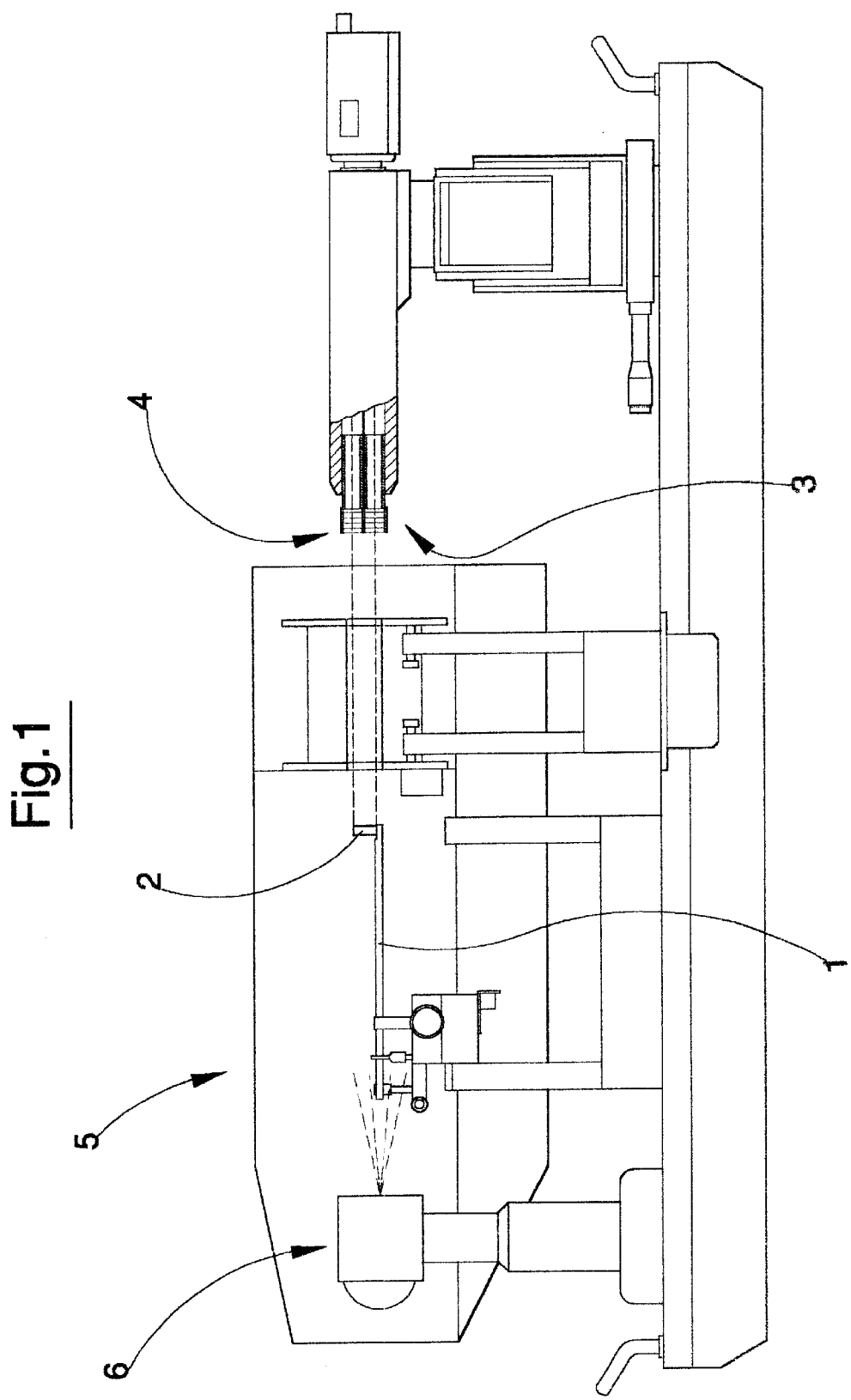
FIG. 1 is a partially-sectioned schematic view in vertical elevation of the invention.
Figure 2:
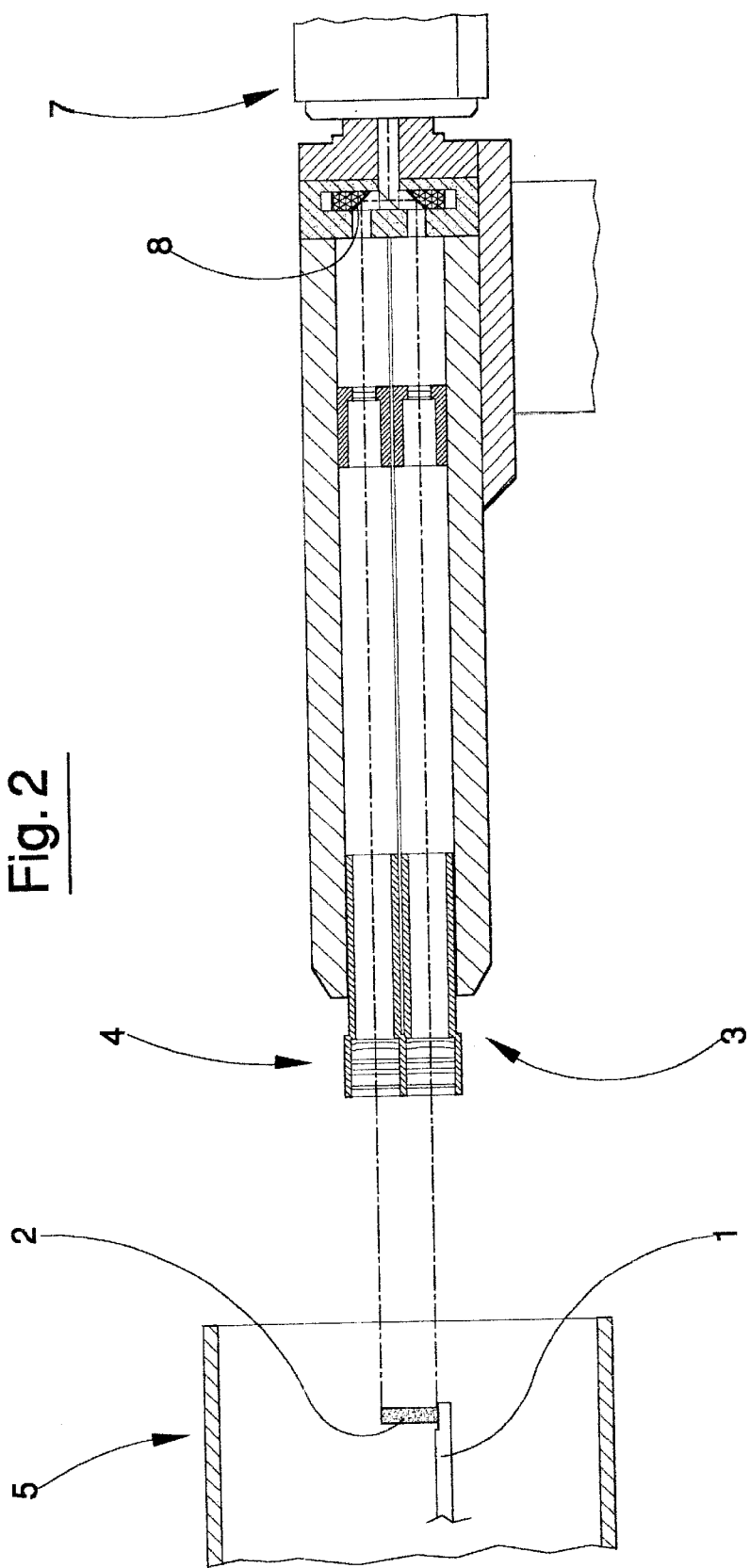
FIG. 2 is an enlarged-scale and completely sectioned view of a detail of FIG. 1.

With reference to the figures of the drawings, 1 denotes a holder for a test piece 2 on which a dilatometer reading is to be taken, i.e. a measurement (curve) of the size variations induced on the test piece subjected, according to certain physical laws, to heating (or cooling).

The apparatus also comprises two optical systems 3 and 4, which identify two optical paths located at a predetermined reciprocal distance from each other. The optical systems 3 and 4 are able to focalize, with predetermined magnification, on the images of the two ends of the test piece 2 arranged on the holder 1.

The optical systems 3 and 4, are arranged aligned on the holder so that the first of the two optical systems 3 or 4 can be focused on one end of the test piece 2 and the second of the optical systems 4 or 3 on another end thereof.

At least one visualizing and measuring device 7 is located posteriorly to the optical systems 3 and 4; the device 7 is able to collect the focalized images of the optical systems 3 and 4, which are arranged in such a way that the relative optical paths are parallel.

The holder 1 and the test piece 2 located thereon are housed internally of a tubular oven 5 which is structured so as to leave the test piece 2 on the holder 1 perfectly in the vision of the optical systems 3 and 4, and in particular the two ends of the test piece 2, which represent the dimension thereof which is to be measured.

A light source 6 illuminates the test piece 2; the light source 6 is located diametrically opposite to the optical systems 3 and 4 with respect to the holder 1 which has the task of illuminating the test piece by contrast.

The optical systems 3 and 4 comprise:

a filter for infrared rays, to eliminate the infrared component emitted by the test piece 2 when at a high temperature; p1 a low-transmittance neutral filter to keep the contrast constant throughout the temperature range;

a lens constituted by an achromatic doublet with long focal length, having the function of transferring the image from inside the oven 5 to a magnifying device;

The magnifying device being constituted by a microscopic magnifying lens which takes the image from the doublet, enlarges the image and sends it on to a viewing and measuring device.

There is usually also a prismatic system to take the image to the designated part of the viewing and measuring device, which is an electronic viewing and measuring device which can be constituted by an interlaced CCD sensor, a progressive scanning sensor, or any image digitalizing system.

With the invention, size variations to which a test piece is subject due to temperature variations can be measured in a process which comprises:

placing a test piece 2 on a holder 1 located internally of an oven 5 (in such a way that both ends of the test piece can be viewed from the outside);

using two optical systems 3 and 4 which identify two optical paths located at a predetermined known reciprocal distance, able to focalize, with a predetermined magnification, images of two ends of a same test piece 2;

using a viewing and measuring device 7 able to collect the images focalized on the optical systems 3 and 4 and to measure a relative distance between the two resulting images;

determining an effective distance between the two ends of the test piece 2 on the basis of a relative distance between the two images and the distance between the two optical paths.

The test piece 2 can be illuminated so that both ends thereof are visible. One way to obtain the above illumination consists in positioning the test piece 2 vertically on the holder 1 internally of the tubular oven 5, or arranging the test piece 2 horizontally and transversally.

The two optical systems 3 and 4 enable two optical paths to be defined, able to focalize images of the two ends of the test piece 2 under examination. The magnification of the image can be in accordance with the lens resolution limitations, with just a few hundredths of a millimetre of both an upper and a lower end (resting on the holder 1) of the test piece 2 being focused upon. As the factor of magnification and the distance between the two optical paths is known, the effective length of the test piece 2 can be determined very precisely.

Once the test piece 2 under examination has been positioned in the oven 5 it is sufficient to train one of the optical systems on one end thereof and another of the optical systems on the end thereof resting on the holder 1. The relative difference between the two images added to the distance between the two optical paths constitutes the measurement of the length of the test piece 2, with a resolution equal to the wave length of the light used. Using filtered white light a resolution of 0.5 $\mu$m can be obtained.

Measurements made in the presence of strong temperature variations are totally independent of the influence of the variations on the test piece 2 holder 1.

If, for example, in a situation where the test piece 2 is vertically positioned on the holder 1, the holder 1 itself is subject to movement because of mechanical vibrations or due to its own thermal dilation, the optical system automatically subtracts the movements of the holder from the measurements, so that the measurements are free from heat-induced changes or measuring system deviations.

With this new method of thermal-mechanical measuring it is no longer necessary to calibrate the measuring system according to the heating cycle. Any displacement of the holder 1 is read off optically and therefore with no contact taking place, then to be subtracted from the measurement carried out on the other end of the test piece 2, also optically and without contact.

The only calibration needed concerns the magnification of the optical system, which has to be done carefully during the optical-parts assembly stage. Thereafter, as there are no moving parts in the whole measuring system, it will never be necessary to carry out further calibration of the measuring system. Practical realization of the double-beam optical system can be done in various ways, according to the measuring needs and the size of the test piece 2.

To improve reliability further, the images of the two ends of the test piece 2 are sent through the prisms 8, on the CCD sensor, so as to eliminate any manufacturing differences that may arise from using CCD sensors made by different producers.

What is claimed is:

1. An apparatus for measuring variations in size on bodies subjected to temperature variations, comprising:
    a holder for a test piece;
    at least two optical systems, identifying two optical paths located at a predetermined and known reciprocal distance, which are able to focalize, with a predetermined degree of magnification, images of two ends of the test piece; the at least two optical systems being aligned with the holder;
    at least one viewing and measuring device able to collect the images which are focalized by the at least two optical systems.

2. The apparatus of claim 1, wherein the optical paths are parallel one to another.

3. The apparatus of claim 2, wherein the holder and the test piece are housed internally of an oven which oven is structured so that at least the test piece on the holder is visible to the at least two optical systems.

4. The apparatus of claim 3, comprising a light source which is located in a diametrically opposite position to the at least two optical systems with respect to the holder and the test piece resting thereon, and which illuminates the test piece by contrast.

5. The apparatus of claim 4, wherein the at least two optical systems comprise:
    a filter for infrared rays, to eliminate the infrared component emitted by the test piece when at a high temperature;
    a low-transmittance neutral filter to keep the contrast constant throughout the temperature range;
    a lens constituted by an achromatic doublet with a long focal length, having the function of transferring an image from inside the oven to a magnifying device;
    the magnifying device being constituted by a microscopic magnifying lens which takes the image from the doublet, enlarges the image and sends it on to a viewing and measuring device.

6. The apparatus of claim 5, comprising a system of prisms for transmitting the image to a predetermined portion of the viewing and measuring device.

7. The apparatus of claim 6, wherein the viewing and measuring device is constituted by an electronic viewing device.

8. The apparatus of claim 7, wherein the electronic viewing device is constituted by an interlaced CCD sensor.

9. The apparatus of claim 8, wherein the electronic viewing device is constituted by a progressive scansion sensor.

10. The apparatus of claim 8, wherein the electronic viewing device is constituted by an image digitalization system.

11. A process for measuring variations in size on bodies subjected to temperature variations, comprising the following steps:
    placing a test piece on a holder located internally of an oven in such a way that ends of the test piece can be viewed from the outside;
    using two optical systems which identify two optical paths located at a predetermined known reciprocal distance, able to focalize, with a predetermined magnification, images of two ends of a same test piece;
    using a viewing and measuring device able to collect the images focalized on the optical systems and to measure a relative distance between the two resulting images;
    determining an effective distance between the two ends of the test piece on the basis of a relative distance between the two images and the distance between the two optical paths.

* * * * *